United States Patent
Camp et al.

[11] 3,896,662
[45] July 29, 1975

[54] ULTRASONIC MEASURING DEVICE

[75] Inventors: William S. Camp, Limestone; Kenneth K. Magnant, Madison, both of Ala.

[73] Assignee: The United States of America as represented by the Secretary of the Army, Washington, D.C.

[22] Filed: Dec. 27, 1973

[21] Appl. No.: 428,951

[52] U.S. Cl. .............................................. 73/67.8 S
[51] Int. Cl.² ........................................ G01N 29/04
[58] Field of Search ........... 73/67.5 R, 67.6, 67.8 R, 73/67.8 S, 67.9

[56] References Cited
UNITED STATES PATENTS 3,732,726 5/1973 Ferber............................. 73/67.5 R
3,827,287 8/1974 Boggs et al. ..................... 73/67.8 S Primary Examiner—Richard C. Queisser
Assistant Examiner—John P. Beauchamp
Attorney, Agent, or Firm—Robert P. Gibson; Nathan Edelberg; Herbert H. Murray

[57] ABSTRACT

The device of the present invention is a production test device which uses ultrasonic sound waves to check a rocket launch tube or any tubular structure for inside and outside diameter as well as wall thickness, ovality, concentricity and straightness.

3 Claims, 3 Drawing Figures

3,896,662

ULTRASONIC MEASURING DEVICE

BACKGROUND OF THE INVENTION

In the manufacture of rocket launch tubes it is necessary to check the tubes for straightness, wall thickness, concentricity between inner and outer walls, and ovality of the tube. The conventional technique for inspecting tubes is to measure inside diameter, outside diameter and wall thickness. In order to do such an inspection it formerly required inside and outside sensor heads which must move through the tube twice for each measurement. It also presents problems of alignment between the inside and outside sensing heads.

It is therefor an object of this invention to provide means whereby all measurements may be made from outside of the tube.

DETAILED DESCRIPTION OF THE INVENTION

Figure 1:
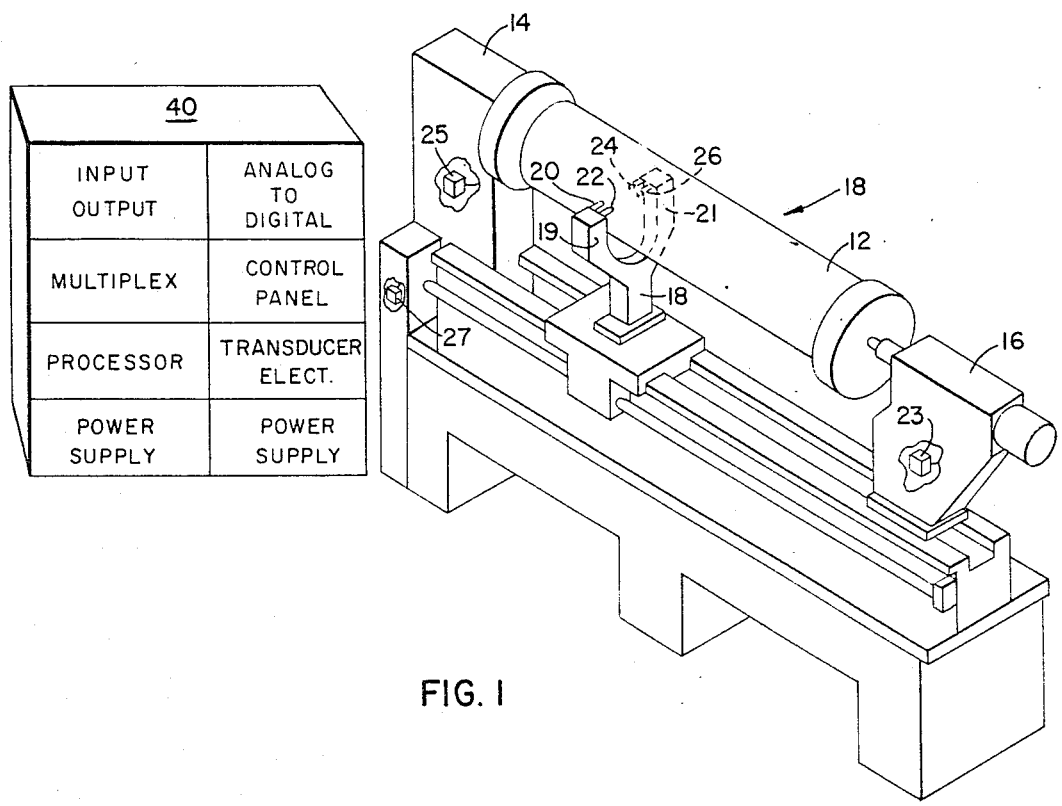
Fig. 1 is a prespective view of a machine incorporating the principles of the present invention.

Referring now to the drawing, 10 generally indicates a lathe like structure on which the tube 12 to be checked is mounted. The lathe includes the usual head stock 14 and tail stock 16. The normal tool holder is replaced by a yoke like element 18. The yoke 18 is bifurcated and has arms 19 and 21 which carry ultrasonic transducers 20, 22, 24 and 26 mounted in pairs, one pair in each leg in opposition to each other on opposite sides of the tube 12. A digital position sensor 23 is mounted in the tail stock 16 to measure the position of the tail stock relative to the head stock and thus the length of the tube 12 and a digital position sensor 25 in the head stock measures the rotary position of the tube. Also a digital position sensor 27 is connected to the lead screw for yoke 18 to indicate the position of the yoke relative to the head stock.

Figure 2:
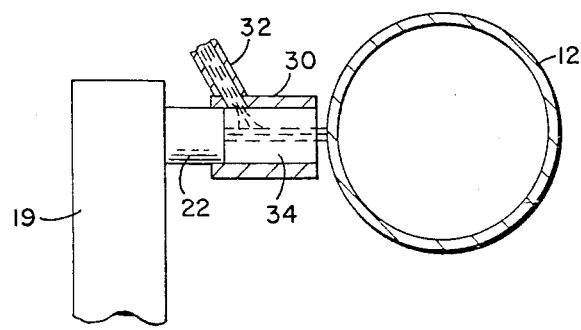
FIG. 2 is a partial section illustrating an ultrasonic transducer head and the water coupling of the transducer head to the object being inspected.

The ultrasonic transducers 20, 22, 24 and 26 are each fitted with a piece of tubing 30, as illustrated in FIG. 2, which extends toward the tube 12. Water is supplied to the tubing 30 through tubing 32 to provide a column of water 34 between the ultrasonic transducer 22 and the tubing 12 being checked. The water forms a coupling medium between the sensor 22 and the tubing 12.

The several sensors and transducers are connected to a minicomputer 40 which may be a Hewlet Packard 2114B, a PDP 11 or any similar minicomputer which is commercially available. The transducers, thru the transducer electronics, continuously updates the tube data. The digital position sensors flag the computer to take data at specific points. These data points are controlled by the priority interrupt circuitry standard in most mini-computers.

In the operation of the device, the sensors in the tail stock, the head stock and the lead screw read directly the positions of the tail stock 11 and yoke carrier 18 relating to the head stock 14 as well as the rotational position of the tube 12. This information is fed directly into the computer. At periodic points during the rotation of the tube 12 and advance of the yoke carrier 18 along its length, the ultrasonic transducers 20, 22, 24 and 26 are pulsed with an ultrasonic pulse. The echos returning from the pulse are detected. There will be two echos for each pulse, one from the interface between the outer surface of the tube and the coupling medium and one from the interface between the inner surface of the tube and the medium within the tube. The time between the pulse and the first echo indicate the distance between the sensor and the outer surface of the tube 12. The time between the pulse and the second echo indicates the distance from the sensor to the inside wall of the tube 12. The difference between these times indicates the tubing wall thickness. The transducer electronics operates on the standard ultrasonic or sonar principle utilized in nautical depth finders, sonar locating equipment, etc. The ultrasonic pulses are repeated at even intervals. During the "dead" space between the pulses, the receiver electronics operates measuring the time of echo. Knowing the speed of sound in both water and the metal, the length of the water column and the thickness of the metal can be computed.

While one ultrasonic transducer would possibly be used applicants disclose four 20, 22, 24, and 26 which work in pairs 20 and 22 and 24 and 26. One transducer of each pair reads the first echo while the second reads the second echo, therefore two pairs simultaneous readings are obtained from opposite sides of the tube.

Figure 3:
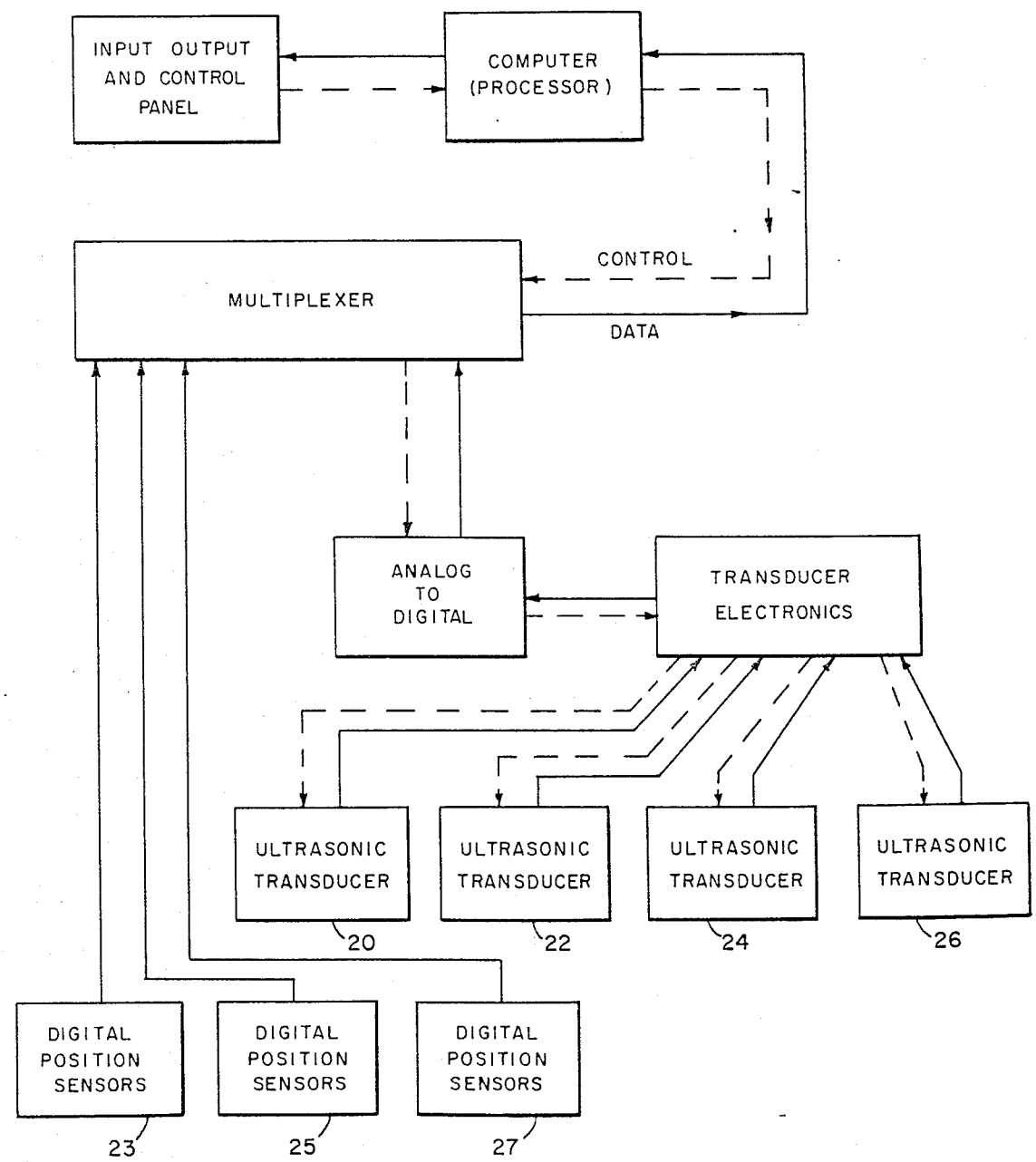
Fig. 3 is a flow diagram illustrating the flow of control information and data through the computer.

As illustrated in FIG. 3 the flow of data through the computer is as follows. First the control functions flow from the input-output and control panel to the computer processor then to the multiplexer and from the multiplexer to the transducer electronics. The data flows from the sensors 23, 25 and 27 direct to the multiplexer. Data from the transducers 20, 22, 24 and 26 flows through the transducer electronics and the analog to digital unit to the multiplexer. From the multiplexer the data flows through the computer processor to the input-output control panel.

The variation between the many pulses as the tube 12 rotates and the yoke 18 advances will indicate the straightness, the ovality and the concentricity of the tube 12. By setting the computer parameters in advance you can obtain a go or no go for each tube checked as well as a complete print out of the measurements made on each tube.

The timing on the rotational speed of the head stock 14 and the advance of the yoke 18 are set so that the device can check about 1 tube every minute.

We claim:

1. A lathe-like machine for checking a tubular member, said lathe-like machine comprising a bed, a head stock mounted at one end of said bed, a tail stock slideably mounted on said bed adjacent the other end thereof and cooperating with said head stock for supporting the tube to be checked, a yoke assembly slideably mounted on said bed for movement between said head stock and tail stock longitudinally of said tube, a computer for interpreting data, sensing means in said tail stock for sensing the position of said tail stock relative to said head stock and relaying said information to said computer thus indicating the length of said tube, sensing means in said head stock for sensing the rotational position of said head stock and relaying said rotational position to said computer, sensing means in said bed for sensing the position of said yoke relative to said head stock and continuously relaying said position to said computer, ultrasonic transducing means in each arm of said yoke for sensing the distance between said arm and the surface of said tube and continuously transmitting said information to said computer, said computer being programmed whereby at certain positions of rotation as sensed by said rotational sensing means a reading is taken of the yoke position relative to said head stock and a distance reading is taken from said ultrasonic transducing means, whereby a series of such reading will indicate the straightness of said tube.

2. A device as set forth in claim 1 wherein a water column is provided between said ultrasonic sensors and the surface of said tube to provide a coupling medium.

3. A device as set forth in claim 2 wherein two ultrasonic sensors are mounted in each arm of said yoke one responsive to the first echo and the other responsive to the second echo from each pulse, whereby a series of said readings will indicate not only the straightness of said tube but the concentricity between the inner and outer surfaces thereof.

* * * * *